July 28, 1953            H. GOTTESMAN            2,646,835
APPARATUS FOR EFFECTING PIN POINT LAMINATION
OF PLASTIC LINERS TO CARTON BOARD
Filed July 13, 1949                              10 Sheets-Sheet 1

FIG. I.

INVENTOR.
HERMAN GOTTESMAN
BY
ATTORNEY

INVENTOR.
HERMAN GOTTESMAN
BY
ATTORNEY

July 28, 1953  H. GOTTESMAN  2,646,835
APPARATUS FOR EFFECTING PIN POINT LAMINATION
OF PLASTIC LINERS TO CARTON BOARD
Filed July 13, 1949  10 Sheets-Sheet 5

INVENTOR.
HERMAN GOTTESMAN
BY
ATTORNEY

INVENTOR.
HERMAN GOTTESMAN

July 28, 1953 H. GOTTESMAN 2,646,835
APPARATUS FOR EFFECTING PIN POINT LAMINATION
OF PLASTIC LINERS TO CARTON BOARD
Filed July 13, 1949 10 Sheets-Sheet 7
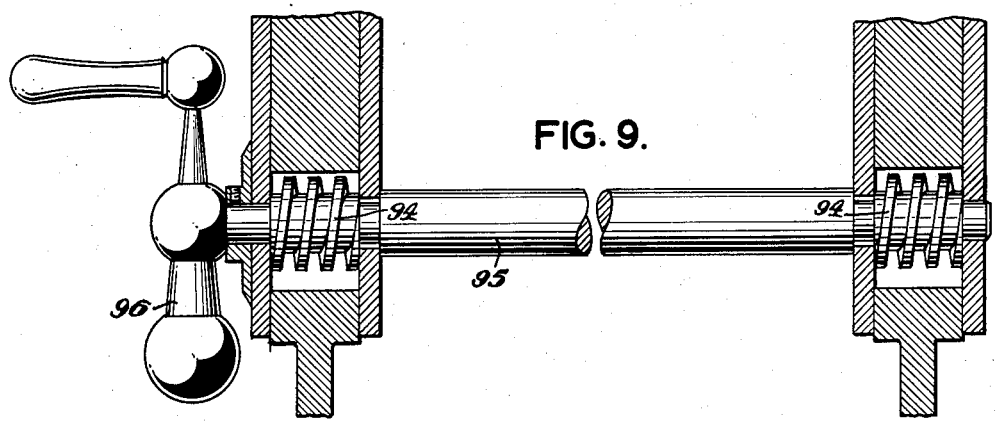
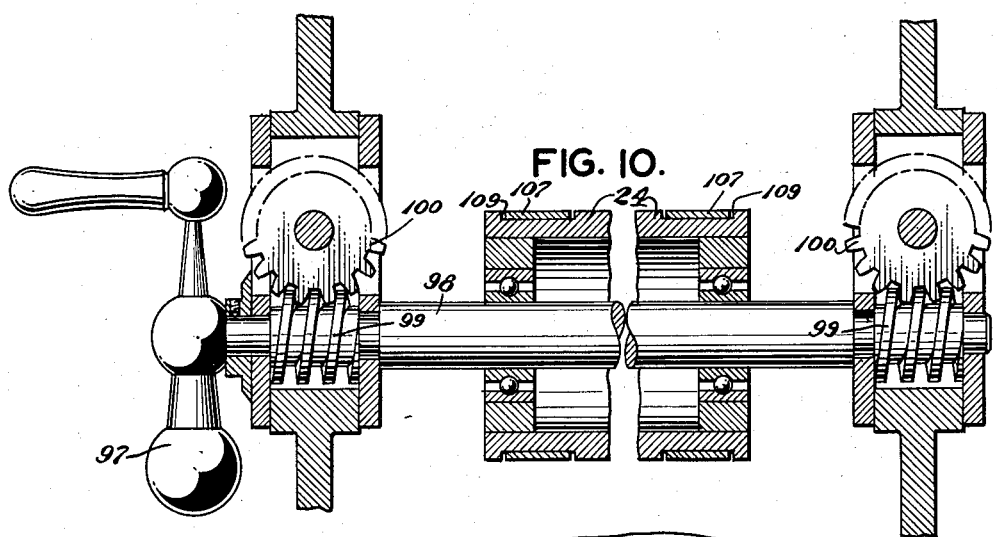
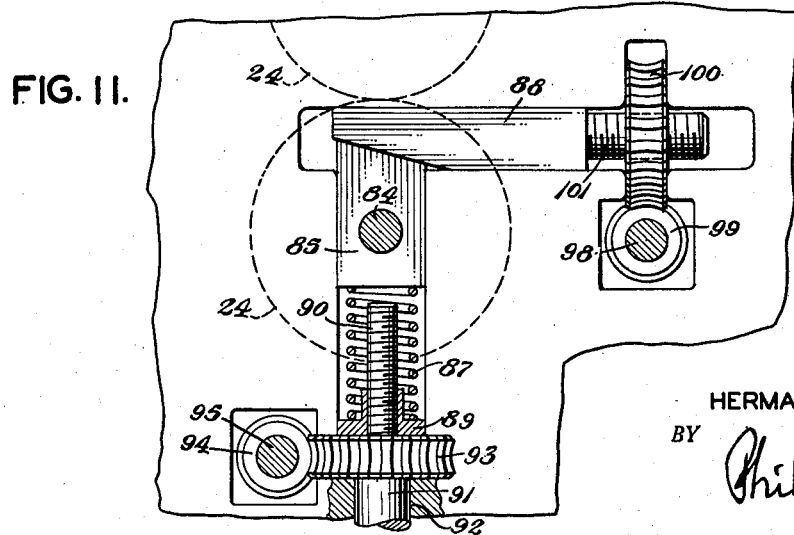
*INVENTOR.*
HERMAN GOTTESMAN
BY
ATTORNEY July 28, 1953 H. GOTTESMAN 2,646,835
APPARATUS FOR EFFECTING PIN POINT LAMINATION
OF PLASTIC LINERS TO CARTON BOARD
Filed July 13, 1949 10 Sheets-Sheet 9
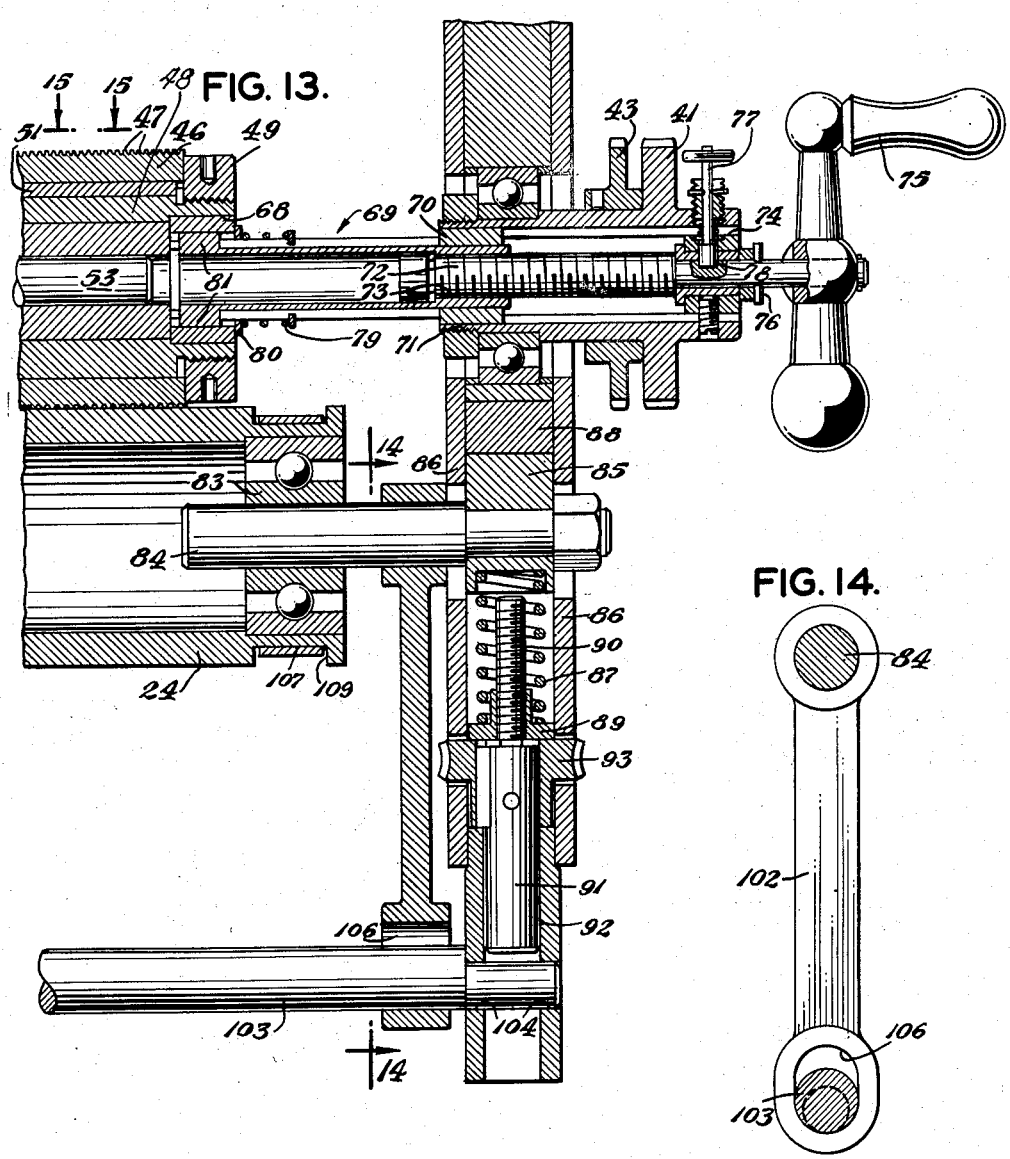
*INVENTOR.*
HERMAN GOTTESMAN
BY
ATTORNEY July 28, 1953 H. GOTTESMAN 2,646,835
APPARATUS FOR EFFECTING PIN POINT LAMINATION
OF PLASTIC LINERS TO CARTON BOARD
Filed July 13, 1949 10 Sheets-Sheet 10

INVENTOR.
HERMAN GOTTESMAN
BY
ATTORNEY

Patented July 28, 1953

2,646,835

UNITED STATES PATENT OFFICE 2,646,835

APPARATUS FOR EFFECTING PIN POINT LAMINATION OF PLASTIC LINERS TO CARTON BOARD

Herman Gottesman, Clifton, N. J., assignor to The Permaline Company, Clifton, N. J.

Application July 13, 1949, Serial No. 104,416

1 Claim. (Cl. 154—1)

The invention here disclosed relates to the manufacture of inner lined folding cartons.

Particular objects of the invention are to effect the lamination of the inner lining to the paper or cardboard base in a manner which while fully securing the two together, will permit of a stripping or peeling of the lining from the board where necessary or desirable, as for instance in the forming of infolding tucks as the end flaps are folded down in the box closing operation.

This delaminating action is made possible in the present invention by a new method of "pin point lamination," wherein attachment is effected through a series of closely spaced points, as distinguished from the previous practice of attachment over more or less extensive areas of engagement.

This "pin point lamination" has many advantages and makes it possible to laminate practically any kind of inner lining to any kind of board, including "bare" or untreated board.

In carrying out this new method thermoplastic bonding is employed.

This may be provided as a coating on the board side of the lining or as a thermoplastic medium present in the lining, and possibly in other ways.

In any event, this "pin point" thermoplastic bonding makes possible the use of different special lining materials, such as a complete "cellophane" lining for window boxes and a waxed paper lining for air-tight and liquid-tight boxes. In the latter instances the "pin point lamination" effects bonding of the inner lining to the board without melting the wax.

Various special containers, such as sift-proof, oil-proof, air-tight and liquid-tight and the like, are all made possible and commercially practical through the special novel features indicated.

Other special purposes of the invention are to provide apparatus for performing the method described which will be of a simple, rugged design operating at a high production rate, which can be produced and operated at reasonably low cost and which, in general, will be thoroughly practical and efficient.

Other desirable objects attained by the invention are set forth or will appear in the course of the following specification.

The drawings accompanying and forming part of the specification illustrate certain present commercial embodiments of the invention. Structure, however, may be modified and changed as regards the present illustration, all within the true intent and broad scope of the invention as hereinafter defined and claimed.

Fig. 1 in the drawings is a diagrammatic view illustrating particularly the driving connections between the various parts of the machine;

Figure 2:
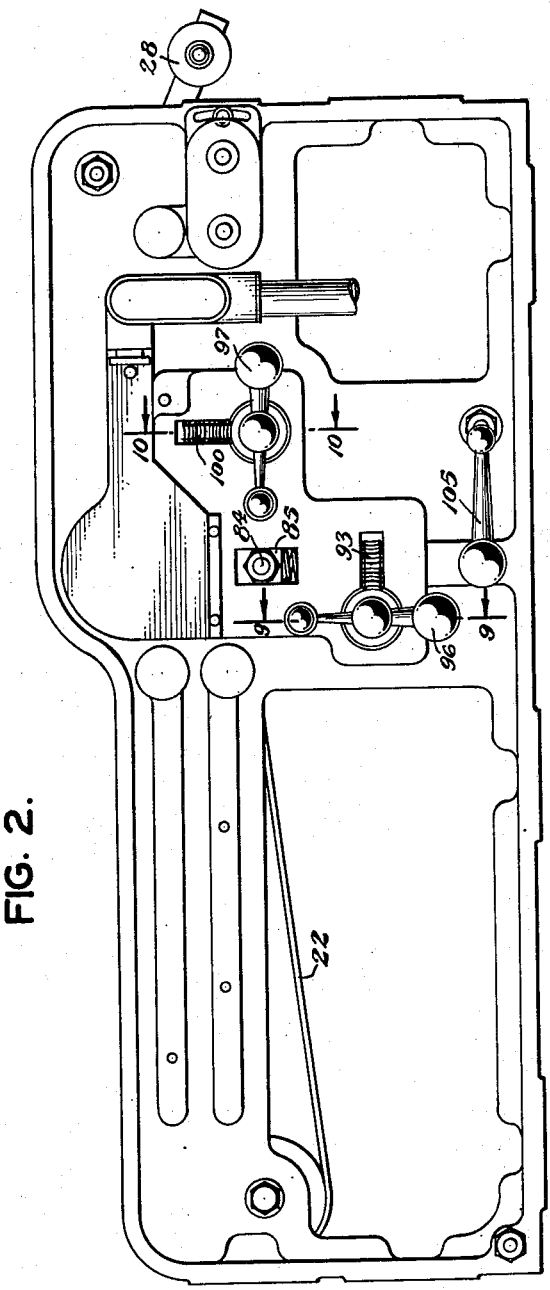
Fig. 2 is a side elevation of the machine viewed in the same relation considered in Fig. 1.
Figure 3:
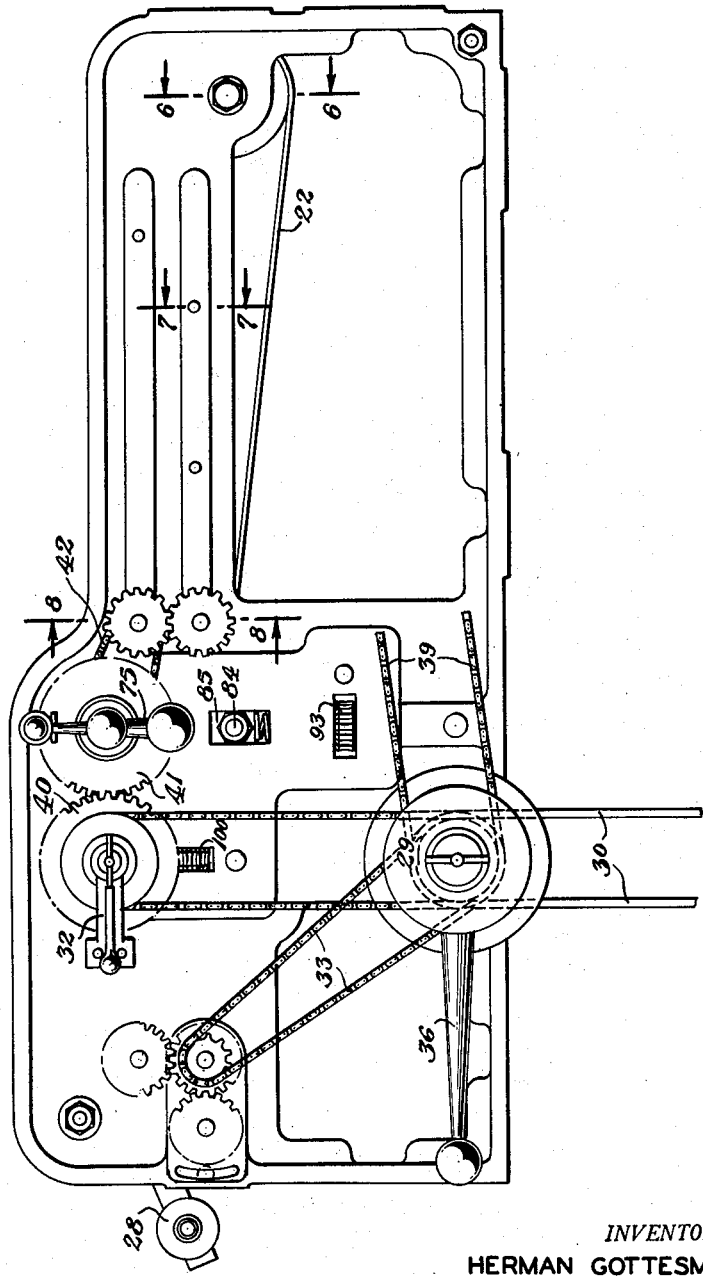
Fig. 3 is an elevation showing the opposite side of the machine.
Figure 4:
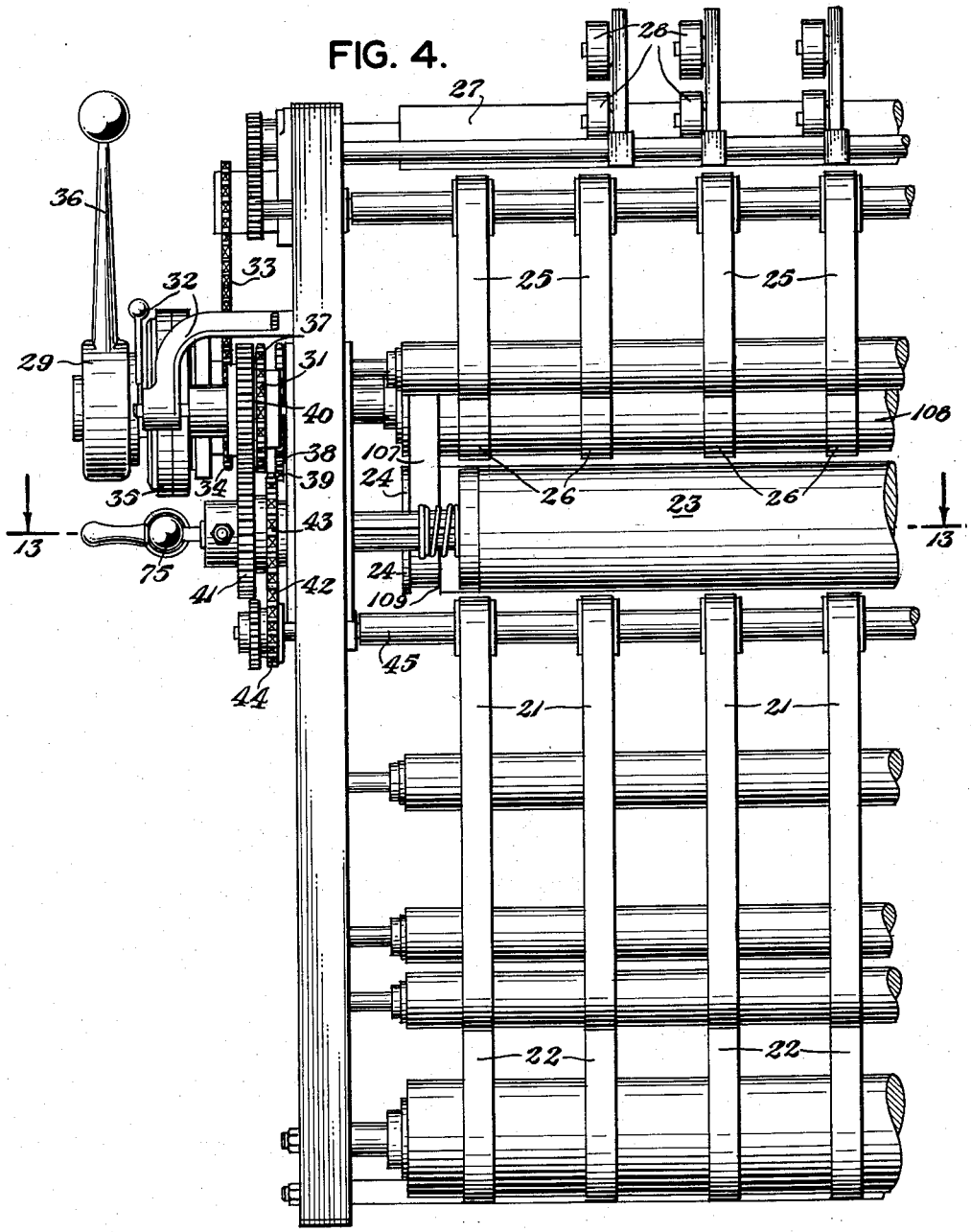
Figs. 4 and 5 are broken plan views of the opposite side portions of the machine shown, respectively, in Figs. 3 and 2.
Figure 5:
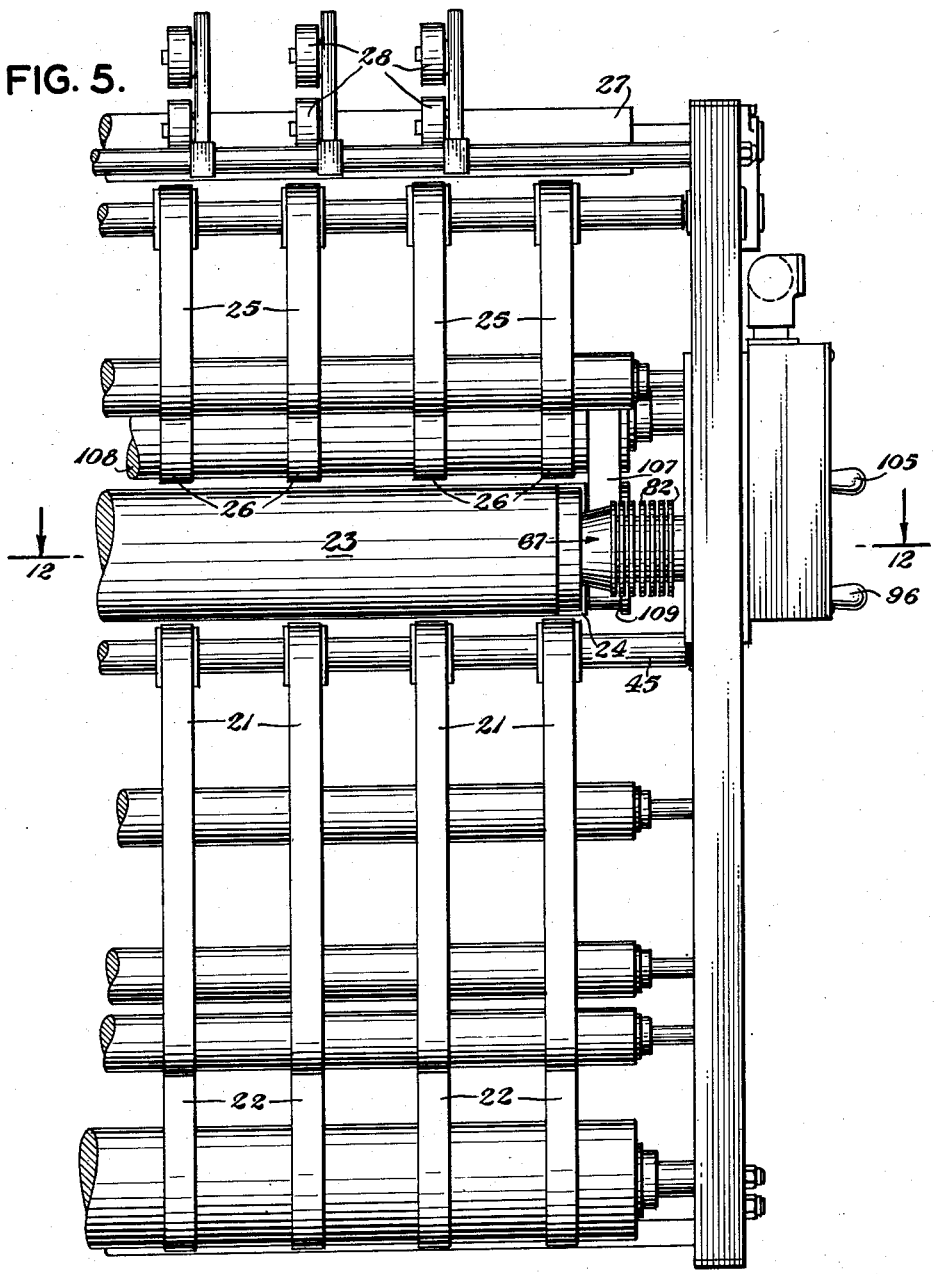
Figure 6:
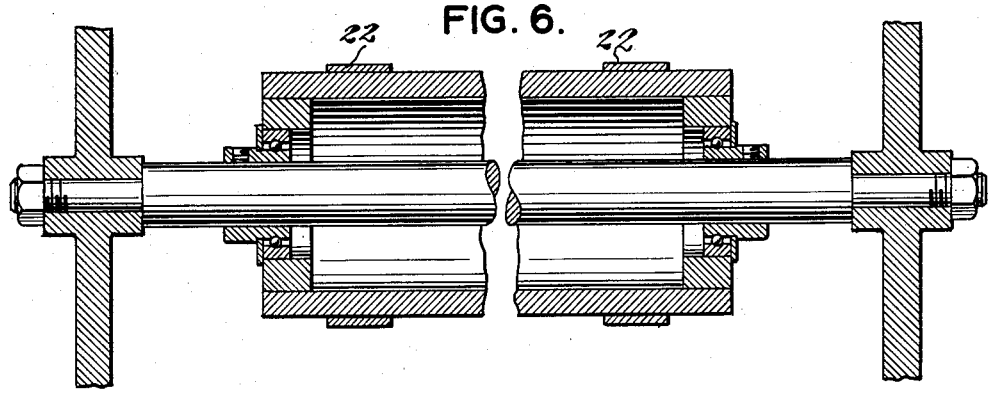
Figure 7:
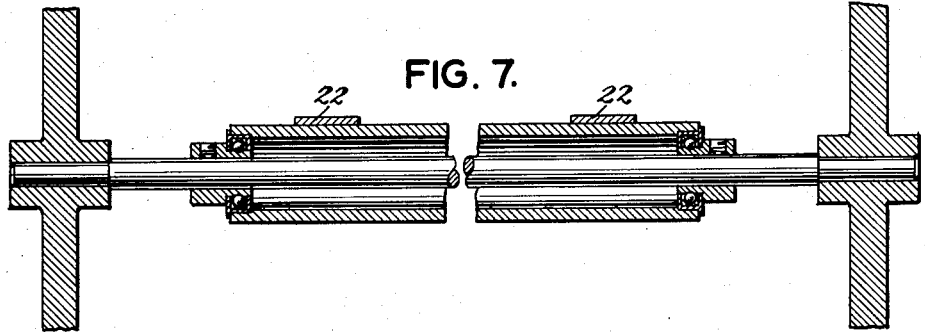
Figure 8:
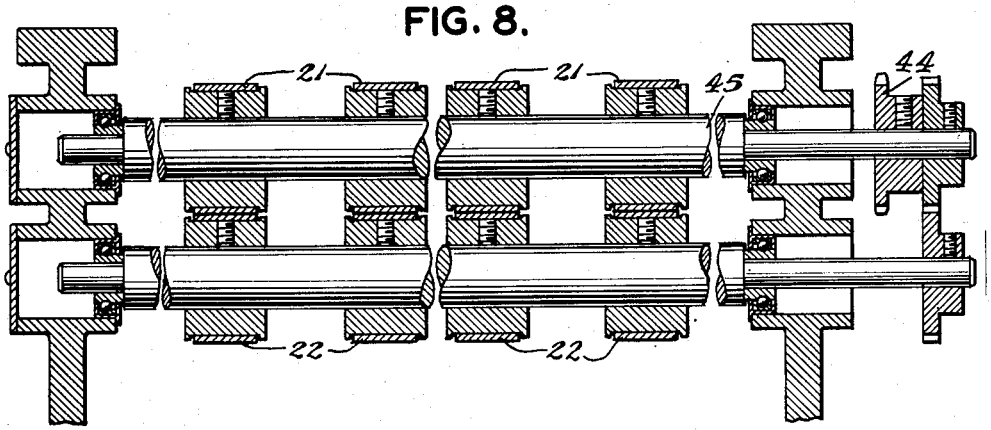
Figure 12:
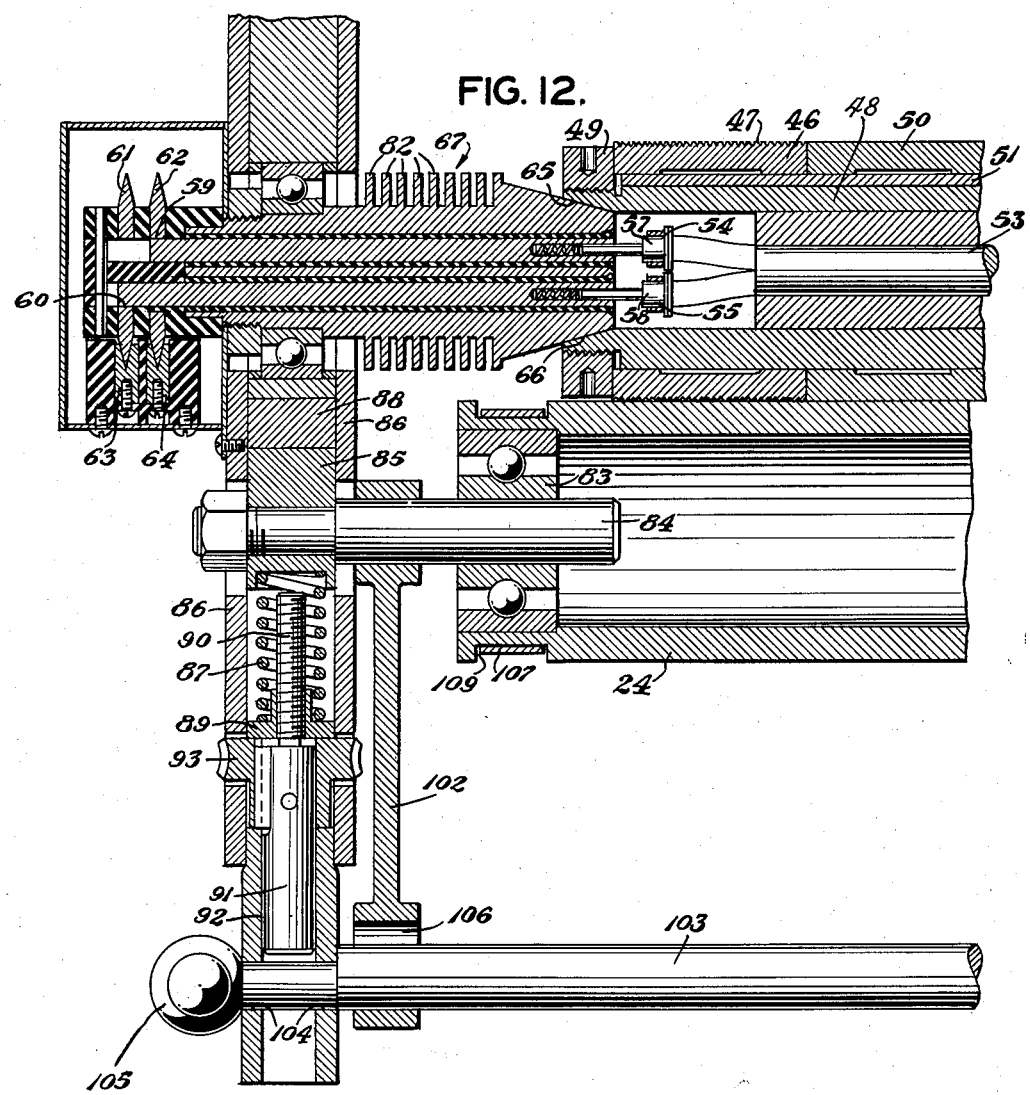
Figure 15:
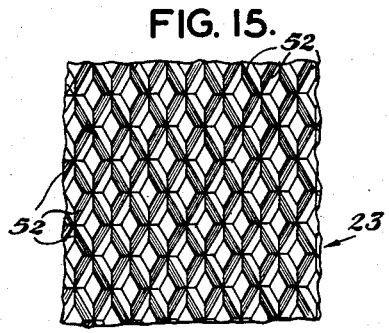
Figure 16:
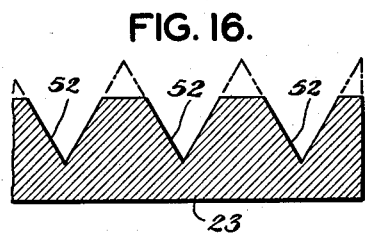
Figure 17:
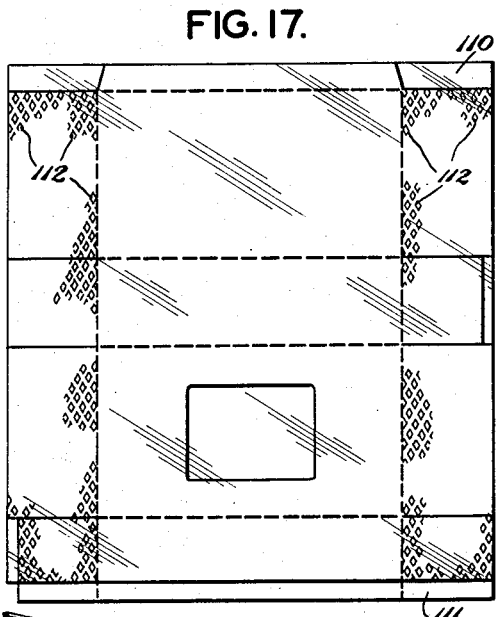
Figure 18:
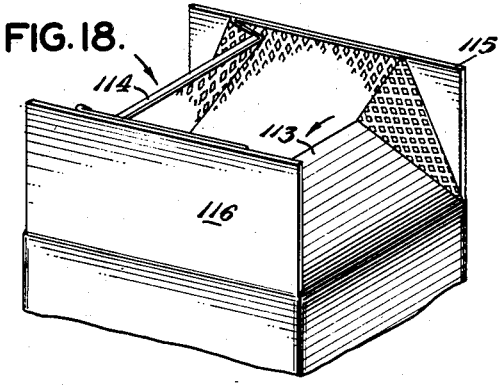

Figs. 6 and 7 are broken sectional views taken on substantially the planes of lines 6—6 and 7—7 of Fig. 3, showing the outer feed roll and one of the inner idler feed rolls, respectively;

Fig. 8 is a similar view on substantially the plane of line 8—8 of Fig. 3, of the inner pair of tape carrying feed rolls;

Fig. 9 is a broken sectional view on substantially the plane of line 9—9 of Fig. 2, of the pressure loading adjustment shaft for the anvil roll;

Fig. 10 is a similar view on line 10—10 of Fig. 2, of the spacing or clearance adjusting mechanism for the anvil roll;

Fig. 11 is a broken vertical sectional detail of both the spring loading and clearance adjusting mechanisms for the anvil roll, the latter being indicated by the lower broken line circle in cooperative relation to the heated laminating roll indicated by the upper broken line circle;

Figs. 12 and 13 are broken sectional continuation views of the companion heated and anvil rolls, these views being taken on substantially the planes of lines 12—12 of Fig. 5 and 13—13 of Fig. 4;

Fig. 14 is a part sectional detail of one of the eccentrically actuated throw-off links, as taken on substantially the plane of line 14—14 of Fig. 13;

Fig. 15 is a detail view in the direction of arrows 15—15, Fig. 13 illustrating one form of laminating points for the heated roller;

Fig. 16 is a broken sectional detail of the laminating points;

Fig. 17 is a plan view of a "pin point" laminated blank for a window box;

Fig. 18 is a broken perspective view illustrating the automatic delamination effected as the flaps of a box are closed.

Figure 1:
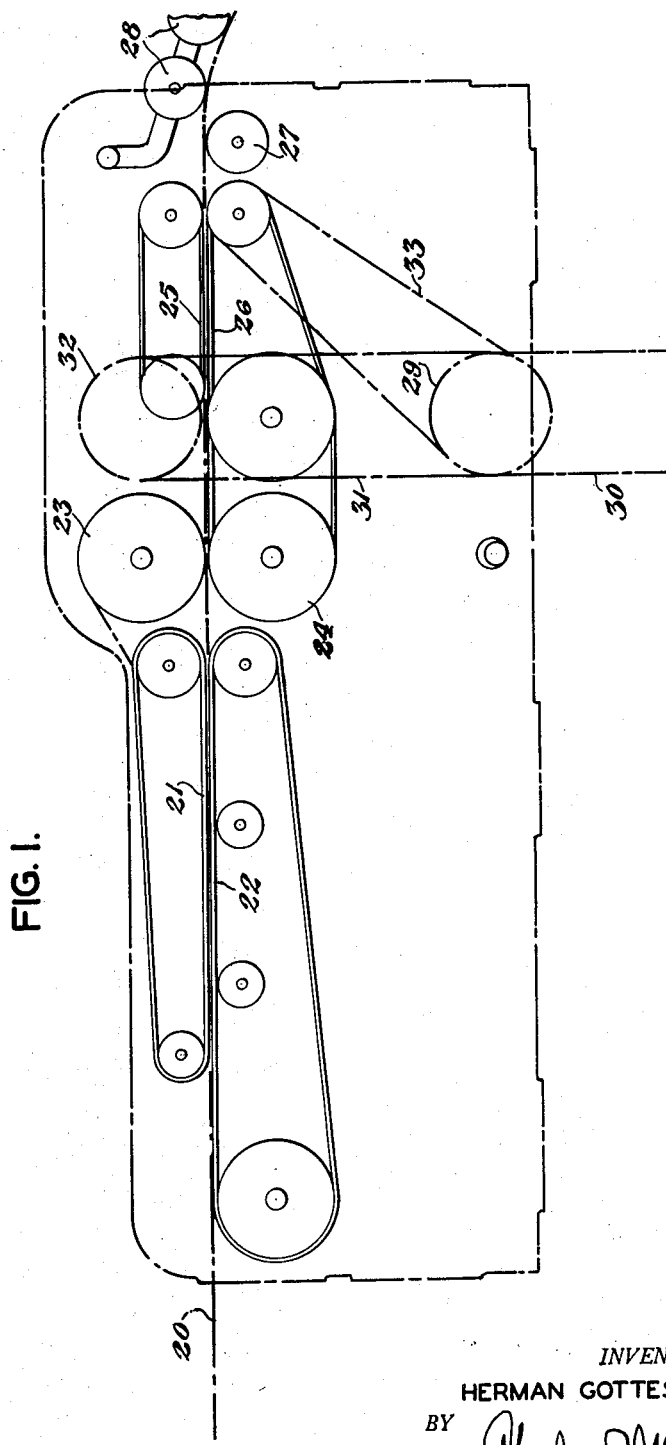

In the diagrammatic view, Fig. 1, the paper line is indicated at 20, passing between upper and lower feed tapes 21, 22, to a heated upper laminating roll 23 in cooperative relation with a lower anvil roller 24.

From these two rollers upper and lower delivery tapes 25, 26, carry the laminated products off to suitable delivery or receiving apparatus such as delivery roll 27 and deflector rolls 28.

A main control clutch is indicated at 29, operated by motor driven belt 30 and connected by chain 31 to drive a clutch 32 controlling action of the heated roller and the feeder. A second chain drive 33 is shown extending from the main clutch to the delivery conveyer.

As a practical matter the main clutch is shown in Fig. 4 as having three chain drive sprockets, the first one, 34, turning with the drive pulley 35 of the clutch and carrying the chain 33 to the delivery tapes so that the delivery mechanism will operate immediately to make sure of clearing the machine when the motor is turned on.

The other two drive sprockets are energized when the clutch is closed by the handle 36, the first of these, 37, carrying the chain 31 to drive the second clutch 32, and the remaining sprocket, 38, carrying a chain 39 for driving a feeder located at the front of the machine, not shown.

As a consequence, the feeder will be operated when the main clutch is closed. The heated roller and the feed tapes may, if desired, be cut out of action by opening the upper clutch 32 which is connected to drive the heated roll through gears 40, 41, and the feed tapes by chain 42 from a sprocket 43 carried by gear 41 and sprocket 44 on the upper feed tape shaft 45.

This particular system of drive and controls enables the machine to be operated, if need be, with the delivery mechanism only in action or with the feeder and delivery mechanism only in operation.

Considering the structure of the laminating roll, this is shown in Figs. 12, 13, 15 and 16, as made up of sleeve sections 46 surfaced with multitudinous, small laminating points 47 and secured over a heated roll core 48 by end clamping screw rings 49.

This construction permits of the substitution of sleeve sections of different size and different laminating point formation to meet various laminating requirements. These sleeve sections may be of different widths, and to fill out the roll, blank or spacer sleeve sections 50 may be interposed where no lamination is required, between the active, point laminating sections. All these interchangeably related sleeve sections may be keyed on the roll core, as indicated at 51.

The laminating points may be produced in various ways, as by cross grooving the surface in closely intersecting grooves 52, Fig. 16, and then shaving the tops off the intervening projections to the same level to leave the closely spaced, small, blunt points desired. The points may be formed in other ways, as by knurling or engraving operations, or by the formation of a fine, granular surface finished to a uniform point level.

The heating of the roll is accomplished, in the illustration, by an electric heater cartridge 53 seated in the open tubular center of the roll core and having terminals 54, 55, engaged by spring contacts 57, 58, connected at 59, 60, with collector rings 61, 62, dipping in mercury wells 63, 64, connected with opposite sides of the line.

To enable quick removal and replacement of laminating rolls they may be constructed as shown, with conical seats 65 as shown in Fig. 12, at the contact making ends to engage over a corresponding conical projection 66 on the stud shaft 67 and with central sockets 68 shown in Fig. 13, in the opposite ends to receive the end of the expansible and retractible tubular supporting shaft 69 slidingly keyed at 70 in the hub portion 71 of the supporting and driving gear 41.

The tubular supporting shaft 69 is shown as extended and retracted by a screw shaft 72 turning within the same and having screw connection therewith at 73.

Shaft 72 is shown journaled at 74 within the hub 71 and as operable by a hand crank 75 arranged to be coupled thereto at 76 by a longitudinal slip movement.

A spring plunger 77 is provided for locking the screw shaft at 78, Fig. 13, in the gear hub, and a spring 79 is shown surrounding the expansible tubular shaft for engaging a thrust washer 80 against the socketed end of the roller.

The latter construction allows for any normal longitudinal expansion of the heated roll under usual operating conditions.

The construction described provides for the making up of the laminating rolls to suit any required point laminating operations and the quick substitution of one roll for another upon backing off the tubular supporting shaft 69 and removal of one roll and replacement by another. The engagement of the beveled socket in the end of the roll over the beveled supporting shaft centers that end of the roll and engages the electrical contacts of the heater, and the advancement of the tubular shaft into the supporting socket of the roll then completes the mounting of that roll and couples it in driven engagement with the operating gear through the sliding key 81 at the end of such tubular shaft.

When the parts are operating the laminating roll is positively driven through the spring plunger 77 and the sliding key 81, and roll expansion is allowed for through the spring thrust action at 79, 80.

Removal of the roll can be quickly effected upon withdrawing the spring plunger 77 and rotating the screw shaft 72 through the medium of the hand crank 75 to withdraw the tubular supporting shaft 69 clear of the end of the roll.

The tapered roll centering stud shaft 67 is shown as having fins 82 for dissipating heat at the electrical conducting end of the roll, and similar provisions may be made at the opposite end of the roll if found necessary or desirable.

Adjustments for roll pressure, clearance and quick throw-off are provided in the construction illustrated, by mounting the anvil roll 24 on bearings shiftable toward and away from the heated roll.

Specifically the anvil roll 24 is shown as supported on bearings 83, carried by stud shafts 84, supported in blocks 85 vertically adjustable between guide plates 86 on the frame of the machine.

Springs 87 thrust these guide blocks upwardly and overstanding wedges 88 are disposed to thrust these blocks downwardly.

Adjustment of the roll closing springs 87 is effected, as shown in Figs. 9, 11, 12 and 13, by the spring abutment nuts 89 slidingly confined between the guide plates 86 and operably engaged by the screw extensions 90 of shafts 91 journaled in the frame structure at 92 and having worm gears 93 fixed thereto and drivingly engaged by worms 94 on the cross shaft 95 operable by hand crank 96.

The clearance determining wedges 88, Fig. 11, are shown as adjusted by a hand crank 97, Fig. 10, on a cross shaft 98, carrying worms 99 in mesh with worm gears 100 in screw engagement with the screw shaft extensions 101 of the wedges.

Thus by operation of hand crank 97, the absolute or minimum clearance between the companion laminating and anvil rolls can be determined and the pressure to be applied by the rolls at such clearance can be fixed by adjustment of the hand crank 96.

For quick throw-off, links 102 are shown in Figs. 12, 13 and 14 engaged at their upper ends over the anvil stud shafts 84 and looped at their lower ends about shaft 103, eccentrically journaled at 104 in the lower portion of the frame and provided with a lever handle 105 for operating the same.

If occasion requires, the machine may be tripped at any time upon simply rocking the lever 105 to turn the eccentric shaft 103 and operate the links 102 to pull the anvil roll down against the tension of springs 87, to free it from coaction with the laminating roll.

The pull-down links 102 are shown as relieved at 106, above the eccentric shaft 103, to permit normal clearance and pressure adjustments of the anvil roll without interference from the unloading shaft, while leaving the latter operative to lower the anvil roll away from the heated roll at any time.

Drive of the anvil roll is effected, as shown in Figs. 4, 5, 10 and 12 by special drive tapes or belts 107 running from the ends of the lower, delivery tape roller 108, over the pulley grooved end portions 109 of the anvil roll.

This provides rotation of the anvil roll irrespective of the clearance, tension or throw-off adjustments of the same. Furthermore, this form of drive assures that the anvil roll will be running at all times the delivery mechanism is in operation, that is, whenever the drive motor is turned on, regardless of the clutch positions.

An example of the work performed by the machine is illustrated in Fig. 17, which shows a transparent plastic liner 110 such as "cellophane," attached to a window carton board 111 by small, closely spaced, diamond shaped pin point laminations 112, along the areas at opposite sides of the window opening.

This point lamination enables sufficient heat to be applied in these small, localized areas to effect quick, instantaneous bonding of the thermoplastic to the cardboard or other material, without burning or injuring the lining or the board. The spacing between these fine points allows for cooling and practically immediate setting of the laminated points. All of this contributes to uniform, high speed production and variations in the selection of lining and board materials. Untreated or "bare" board may be used instead of the specially treated paper and cardboards ordinarily employed.

Linings of impregnated and wax coated papers in particular may be used, since the points with the cooling spaces in between do not melt the wax enough to cause it to flow or lose its surface continuity in the instant of time required to bond the point at the opposite side of the sheet to the board.

Linings of metal foil and other special materials can be applied by the point tacking method disclosed. The point laminating may be alternated with continuous strip or surface laminating by proper arrangement of point lamination and surface lamination sleeve sections on the heated roll. For example, the inner liner may be applied to the body forming portion of the board with plain surface lamination and to the end flap portions of the board with the pin point form of lamination.

The latter feature becomes of particular importance where, as illustrated in Fig. 18, the narrow end flaps 113, 114, in being turned down, will strip away portions of the lining from the wider flaps 115, 116, but only so much as needed by the narrow flaps in the folding down to closed position, leaving the remaining portions still attached and ready to overlap properly in the successive folding movements of the box flaps. The point lamination, while permitting this necessary peeling action, exercises a control by imposing sufficient restraint on the detachment to avoid any looseness and to maintain the tucks of lining material in firm, close-folding relation.

While for greater uniformity machine tooled laminating points may generally be preferred, it is contemplated that these points may be formed by scoring, engraving, knurling, striating or other roughening or surface pointing operations.

The machine is readily adaptable to various requirements of point size, shape, spacing and distribution and to such factors as speed, time of contact, heat and the like. Thermostatic control may be utilized to maintain the laminating roll at predetermined temperatures best suited to the work in hand.

The construction, for the work accomplished, is relatively simple and quickly understood for operating to best advantage. While ordinarily and preferably an automatic feeder may be employed, it will be appreciated that the machine may be fed by hand or in semi-automatic fashion. If desired, a tacker may be employed for attaching the inner linings and boards in registered relation as they enter the machine, and possibly other variations may be utilized, all within the scope of the invention as herein disclosed and clamed.

The choice of materials made possible by this invention enables manufacture on the same machine of a great variety of conventional or special cartons, including those sealed liquid-tight, airtight, sift-proof and the like.

Because of the automatic delaminating action made possible by the invention, the inner lining may be the complete full size of the board with one strengthening and reinforcing the other and providing in the end a better closed carton of novel characteristics, the subject of Patent No. 2,599,708 issued June 10, 1952. These full lining and reinforcing features enable production of special purpose containers for various liquids, oils and greases.

As the invention is of broad scope, the terms employed herein have been used in a descriptive rather than in a limiting sense, except possibly as limitations may be imposed by state of the prior art.

What is claimed is:

Apparatus for pin point laminating thermoplastic inner lining to flat carton board, comprising companion laminating and anvil rolls, said anvil roll being substantially smooth to provide continuous smooth support for the board and superimposed lining, shafting for the laminating roll and gearing for driving said shafting, said laminating roll comprising a central heated roll core removably engaged with said shafting and a laminating sleeve removably engaged on said core and having a predetermined pattern of closely spaced laminating projections terminating in small, blunt tips, adjustable means for holding the anvil roll toward the laminating roll to support the board in position for the blunt tips of the laminating projections to impress small, closely spaced heated areas of the lining into the surface of the board and thereby to secure the lining to the board by small, separated, closely spaced thermoplastic bonds according to the pattern of the laminating projections on the laminating sleeve, and means for heating the core of the laminating roll including readily separable heating medium supply connections associated with the shafting supporting said core.

HERMAN GOTTESMAN.

References Cited in the file of this patent

UNITED STATES PATENTS

| Number | Name | Date |
| --- | --- | --- |
| 179,121 | Mackh | June 27, 1876 |
| 1,628,203 | Stein | May 10, 1927 |
| 2,113,128 | Cunnington | Apr. 5, 1935 |
| 2,231,132 | Lovett | Feb. 11, 1941 |
| 2,331,054 | Shively | Oct. 5, 1943 |
| 2,341,979 | Cunnington | Feb. 15, 1944 |
| 2,374,504 | Salfisberg | Apr. 24, 1945 |
| 2,376,253 | Humphrey | May 15, 1945 |
| 2,390,550 | Moore | Dec. 11, 1945 |